United States Patent
Kubota et al.

(10) Patent No.: US 12,403,526 B2
(45) Date of Patent: Sep. 2, 2025

(54) CRANKSHAFT AND METHOD OF MANUFACTURING FORGED MATERIAL FOR CRANKSHAFT

(71) Applicant: NIPPON STEEL CORPORATION, Tokyo (JP)

(72) Inventors: Manabu Kubota, Tokyo (JP); Taketo Maejima, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/754,862

(22) PCT Filed: Nov. 2, 2020

(86) PCT No.: PCT/JP2020/041041
§ 371 (c)(1),
(2) Date: Apr. 14, 2022

(87) PCT Pub. No.: WO2021/090799
PCT Pub. Date: May 14, 2021

(65) Prior Publication Data
US 2024/0091847 A1    Mar. 21, 2024

(30) Foreign Application Priority Data
Nov. 7, 2019    (JP) ................. 2019-202532

(51) Int. Cl.
*B21K 1/08*    (2006.01)
*C21D 9/30*    (2006.01)
*C22C 38/00*   (2006.01)

(52) U.S. Cl.
CPC ........... *B21K 1/08* (2013.01); *C21D 9/30* (2013.01); *C22C 38/00* (2013.01)

(58) Field of Classification Search
None
See application file for complete search history.

(56) References Cited

U.S. PATENT DOCUMENTS

2007/0000582 A1    1/2007    Matsuzaki et al.
2011/0017351 A1    1/2011    Suwa et al.
(Continued)

FOREIGN PATENT DOCUMENTS

CN    1802446 A    7/2006
CN    104204263 A    12/2014
(Continued)

OTHER PUBLICATIONS

Machine translation of JP2006-028598A. (Year: 2006).*
(Continued)

*Primary Examiner* — Xiaowei Su
(74) *Attorney, Agent, or Firm* — Greer, Burns & Crain, Ltd.

(57) ABSTRACT

A crankshaft with improved fatigue strength and machinability is provided. The crankshaft includes a pin and journal, having a chemical composition of, in mass %: 0.40 to 0.60% C; 0.01 to 1.50% Si; 0.4 to 2.0% Mn; 0.01 to 0.50% Cr; 0.20 to 0.50% Al; 0.001 to 0.02% N; up to 0.03% P; 0.005 to 0.20% S; 0.005 to 0.060% Nb; 0 to 0.060% Ti; and balance Fe and impurities, wherein, for each of the pin and journal, the hardness measured at a position at a depth of ¼ of the diameter from the surface is higher than HV 245, the microstructure at that position is mainly composed of ferrite/pearlite, and the fraction of ferrite is not lower than 16%.

4 Claims, 3 Drawing Sheets

(56) References Cited

U.S. PATENT DOCUMENTS

| | | | |
|---|---|---|---|
| 2012/0063945 A1 | 3/2012 | Tsuchida et al. | |
| 2015/0044086 A1 | 2/2015 | Miyanishi et al. | |
| 2018/0372146 A1* | 12/2018 | Li | C22C 38/26 |

FOREIGN PATENT DOCUMENTS

| | | | | |
|---|---|---|---|---|
| CN | 106555114 A | * | 4/2017 | |
| CN | 107587076 A | | 1/2018 | |
| CN | 109266966 A | * | 1/2019 | ............. C22C 38/02 |
| CN | 109554618 A | * | 4/2019 | ........... C22C 38/001 |
| JP | 2006028598 A | * | 2/2006 | ............. C22C 38/02 |
| JP | 2009242842 A | | 10/2009 | |
| JP | 5585758 B2 | | 8/2014 | |
| JP | 2017171977 A | | 9/2017 | |
| WO | WO-2010140596 A1 | * | 12/2010 | ............... C21D 9/30 |
| WO | 2011155605 A1 | | 12/2011 | |

OTHER PUBLICATIONS

Machine translation of Cn 109266966A. (Year: 2019).*
Machine translation of CN 106555114A. (Year: 2017).*
Machine translation of WO2010140596A1. (Year: 2010).*
Machine translation of CN109554618A. Apr. 2, 2019. (Year: 2019).*
Satoru Nakamyou et al.; Development of High Strength Steel with Superior Machinability for Induction Hardening. Sanyo Technical Report, vol. 11 (2004), No. 1, pp. 57-60).
Masanao Fujiwara et al.; "Controlled Forging Technique for Mechanical Properties using Thermo-Mechanical Heat Treatment"; Technical Review; 2011; pp. 157-163.
Maki Tadashi, "Microstructure Control in Steel," Uchida Rokakuho Publishing Co., Ltd., 2015.
Umezawa Osamu, "Microstructure and Phase Transformation in Heat Treatment of Steel," Bulletin of the JSTP, vol. 4, No. 38 (Feb. 2021).

* cited by examiner

CRANKSHAFT AND METHOD OF MANUFACTURING FORGED MATERIAL FOR CRANKSHAFT

TECHNICAL FIELD

The present invention relates to a crankshaft and a method of manufacturing a forged material for a crankshaft.

BACKGROUND ART

A crankshaft is manufactured by hot forging a steel material into a forged material and then performing machining, such as cutting, grinding and/or hole drilling, and, when necessary performing a surface hardening process such as induction hardening.

To improve the fatigue strength of a crankshaft that has been induction hardened prior to use, it is necessary to improve the hardness of not only the portions that have been induction hardened (hereinafter referred to as "induction-hardened portions"), but also the portions that have not been induction hardened (hereinafter referred to as "non-induction-hardened portions"). To improve the hardness of both the induction-hardened portions and non-induction-hardened portions, it is effective to increase the C content of the steel material. However, an increased C content may decrease machinability leading to increased machining costs.

One known method for improving hardness without increasing C content involves adding V to steel material, where the precipitation strengthening derived from VC is utilized. However, V is a relatively expensive element and subjected to price fluctuations; thus, from a commercial viewpoint, it is preferable not to use V.

WO 2010/140596 discloses a steel for machine structural use where four elements, namely N, Ti, B and Al, are balanced so as to satisfy a specific relationship, thereby improving machinability. WO 2011/155605 discloses a high-strength steel where the area ratio of bainite contained in the metal microstructure is controlled in accordance with the amount of C contained in the steel, thereby improving machinability.

JP 2009-30160 A discloses a machinery structural steel containing a predetermined amount of Al. WO 2010-116670 discloses a steel for carburizing containing a predetermined amount of Al. JP 2012-162780 A discloses a method of manufacturing a forged part where, within a single part, portions with high strength and portions with low strength are formed without heat treatment.

PRIOR ART DOCUMENTS

Patent Documents

Patent Document 1: WO 2010/140596
Patent Document 2: WO 2011/155605
Patent Document 3: JP 2009-30160 A
Patent Document 4: WO 2010-116670
Patent Document 5: JP 2012-162780 A

Non-Patent Documents

Non-Patent Document 1: NAKAMYOU Satoru et al., "Development of High Strength Steel with Superior Machinability for Induction Hardening", Sanyo Technical Report, Vol. 11 (2004), No. 1, pp. 57-60

Non-Patent Document 2: FUJIWARA Masanao et al., "Controlled Forging Technique for Mechanical Properties Using Thermo-Mechanical Heat Treatment", Denki-Seiko, Vol. 82, No. 2 (2011), pp. 157-163

SUMMARY OF THE INVENTION

Problems to be Solved by the Invention

The contemplated specific applications of the techniques of WO 2010/140596 and WO 2011/155605, discussed above, are gears, and sufficient discussion is not given on a fatigue strength (i.e., bending fatigue strength) required of crankshafts.

An object of the present invention is to provide a crankshaft with improved fatigue strength and machinability.

Means for Solving the Problems

A crankshaft according to an embodiment of the present invention is a crankshaft including a pin and a journal, having a chemical composition of, in mass %: 0.40 to 0.60% C; 0.01 to 1.50% Si; 0.4 to 2.0% Mn; 0.01 to 0.50% Cr; 0.20 to 0.50% Al; 0.001 to 0.02% N; up to 0.03% P; 0.005 to 0.20% S; 0.005 to 0.060% Nb; 0 to 0.060% Ti; and balance Fe and impurities, wherein, for each of the pin and journal, a hardness measured at a position at a depth of ¼ of a diameter from a surface is higher than HV 245, a microstructure at that position is mainly composed of ferrite/pearlite, and a fraction of ferrite is not lower than 16%.

A method of manufacturing a forged material for a crankshaft according to an embodiment of the present invention includes: preparing a steel material having a chemical composition of, in mass %: 0.40 to 0.60% C; 0.01 to 1.50% Si; 0.4 to 2.0% Mn; 0.01 to 0.50% Cr; 0.20 to 0.50% Al; 0.001 to 0.02% N; up to 0.03% P; 0.005 to 0.20% S; 0.005 to 0.060% Nb; 0 to 0.060% Ti; and balance Fe and impurities; hot forging the steel material such that a temperature directly before finish forging is higher than 800° C. and lower than 1100° C.; and, after the hot forging, cooling the steel material such that an average cooling rate in a temperature range from 800 to 650° C. is not higher than 2.5° C./s.

A method of manufacturing a forged material for a crankshaft according to an embodiment of the present invention includes: preparing a steel material having a chemical composition of, in mass %: 0.40 to 0.60% C; 0.01 to 1.50% Si; 0.4 to 2.0% Mn; 0.01 to 0.50% Cr; 0.20 to 0.50% Al; 0.001 to 0.02% N; up to 0.03% P; 0.005 to 0.20% S; 0.005 to 0.060% Nb; 0.005 to 0.060% Ti; and balance Fe and impurities; hot forging the steel material such that a temperature directly before finish forging is higher than 800° C. and not higher than 1180° C.; and, after the hot forging, cooling the steel material such that an average cooling rate in a temperature range from 800 to 650° C. is not higher than 0.07° C./s.

Effects of the Invention

The present invention provides a crankshaft with improved fatigue strength and machinability.

EMBODIMENTS FOR CARRYING OUT THE INVENTION

Figure 1:
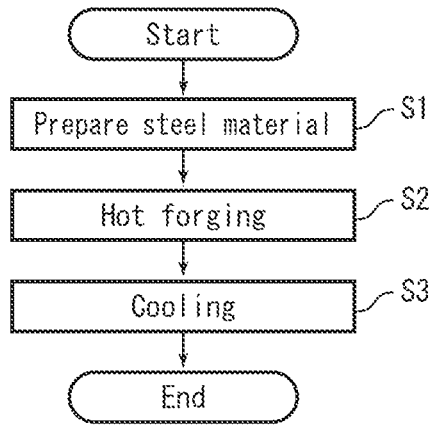
FIG. 1 is a flow chart illustrating a method of manufacturing a forged material for a crankshaft according to an embodiment of the present invention.

The inventors attempted to find a way to improve the fatigue strength and machinability of crankshafts, and obtained the following findings.

As discussed above, a crankshaft that has been induction hardened prior to use includes induction-hardened portions and non-induction-hardened portions (i.e., base material). The induction-hardened portions have a microstructure mainly composed of martensite or tempered martensite, whereas the non-induction-hardened portions have a microstructure mainly composed of ferrite/pearlite.

An increased amount of C decreases machinability because the increased C improves hardness and, in addition, decreases the fraction of ferrite in the ferrite/pearlite. On the other hand, a comparison among steels with the same C content has been reported that shows that an increased ferrite fraction results in an equal or even higher fatigue strength (NAKAMYOU Satoru et al., "Development of High Strength Steel with Superior Machinability for Induction Hardening", Sanyo Technical Report, Vol. 11 (2004), No. 1, pp. 57-60). This is presumably because an increased ferrite fraction effectively results in finer crystal grains.

Thus, increasing ferrite fraction compared with typical ferrite/pearlite steels with the same C content will improve both machinability and fatigue strength. For a C content in the range of 0.40 to 0.60 mass %, a ferrite fraction of 16% or higher will provide a steel with an improved balance between fatigue strength and machinability.

It has been reported that lowering finish forging temperatures during the hot forging process can increase ferrite fraction (FUJIWARA Masanao et al., "Controlled Forging Technique for Mechanical Properties Using Thermo-Mechanical Heat Treatment", Denki-Seiko, Vol. 82, No. 2 (2011), pp. 157-163). However, lowering forging temperatures significantly reduces the die life. From a productivity viewpoint, it is preferable that ferrite fraction can be increased without excessively lowering forging temperatures.

The present inventors found that combined addition of appropriate amounts of Al and Nb to a steel material will increase ferrite fraction without excessively lowering forging temperatures. This is thought to occur by the following mechanism.

Austenite grains (hereinafter referred to as "γ grains") that have been processed by hot forging recrystallize in order to relieve strain that has been introduced by the forging. At this time, NbC, NbN and Nb(CN) that have precipitated in the γ grains suppress growth of γ grains after recrystallization. This results in finer γ grains. Finer γ grains mean increased crystal grain boundaries per unit area, which provide ferrite nucleation sites, thus increasing ferrite fraction.

Al is a ferrite-forming element which significantly raises the $A_3$ point and enlarges the region in which pro-eutectoid ferrite is produced toward higher temperatures. Al also has the effect of increasing eutectoid carbon concentration, and increases the maximum fraction of pro-eutectoid ferrite expected from the equilibrium state. A steel containing an appropriate amount of Al has a wide region in which pro-eutectoid ferrite precipitates during the cooling process after hot forging, and has a high maximum fraction of pro-eutectoid ferrite expected from the equilibrium state, thus increasing ferrite fraction after hot forging.

Thus, Nb achieves finer γ grains to increase ferrite fraction, whereas Al enlarges the region in which pro-eutectoid ferrite precipitates and itself has the effect of increasing pro-eutectoid ferrite, thereby increasing ferrite fraction. Combined addition of Al and Nb superimposes these effects, thus significantly increasing ferrite fraction.

The present inventors also found that ferrite fraction can be further increased if, in addition to Al and Nb, an appropriate amount of Ti is contained in the steel material and the average cooling rate in the temperature range from 800 to 650° C. is reduced. They also found that a predetermined amount of ferrite can be ensured, even when forging temperatures are further increased, by means of combined addition of appropriate amounts of Al, Nb and Ti to the steel material and an average cooling rate in the temperature range from 800 to 650° C. not higher than 0.07° C./s.

The present invention was made based on the above-discussed findings. Now, a crankshaft and a method of manufacturing a forged material for a crankshaft according to an embodiment of the present invention will be described in detail.

[Crankshaft]
[Chemical Composition]

The crankshaft according to the present embodiment has a chemical composition as described below. In the description below, "%" in the content of each element means mass %.

C: 0.40 to 0.60%

Carbon (C) improves the hardness of induction-hardened and non-induction-hardened portions, and thus contributes to an improvement in fatigue strength. On the other hand, an excessively high C content decreases quench-cracking resistance and machinability. In view of this, C content is to be 0.40 to 0.60%. A lower limit for C content is preferably 0.45%, and more preferably 0.48%. An upper limit for C content is preferably 0.55%, and more preferably 0.52%.

Si: 0.01 to 1.50%

Silicon (Si) has a deoxidation effect and the effect of strengthening ferrite. On the other hand, an excessively high Si content decreases machinability. In view of this, Si content is to be 0.01 to 1.50%. A lower limit for Si content is preferably 0.05%, and more preferably 0.40%. An upper limit for Si content is preferably 1.00%, and more preferably 0.60%.

Mn: 0.4 to 2.0%

Manganese (Mn) increases the hardenability of steel and contributes to an improvement in the hardness of the induction-hardened portions. On the other hand, if Mn content is excessively high, bainite is produced during the cooling process after hot forging, decreasing machinability. In view of this, Mn content is to be 0.4 to 2.0%. A lower limit for Mn content is preferably 1.0%, and more preferably 1.2%. An upper limit for Mn content is preferably 1.8%, and more preferably 1.6%.

Cr: 0.01 to 0.50%

Chromium (Cr) increases the hardenability of steel and contributes to an improvement in the hardness of the induction-hardened portions. On the other hand, if Cr content is excessively high, bainite is produced during the cooling process after hot forging, decreasing machinability. In view of this, Cr content is to be 0.01 to 0.50%. A lower limit for Cr content is preferably 0.05%, and more preferably 0.10%. An upper limit for Cr content is preferably 0.30%, and more preferably 0.20%.

Al: 0.20 to 0.50%

Aluminum (Al) is a ferrite-forming element which significantly raises the $A_3$ point and enlarges the region in which pro-eutectoid ferrite is produced toward higher temperatures. Al also has the effect of increasing eutectoid carbon concentration, and increases the maximum fraction of pro-eutectoid ferrite expected from the equilibrium state. On the other hand, an excessively high Al content results in an excessive amount of alumina-based inclusions produced, decreasing machinability. In view of this, Al content is to be 0.20 to 0.50%. A lower limit for Al content is preferably 0.25%. An upper limit for Al content is preferably 0.45%, and more preferably 0.40%.

N: 0.001 to 0.02%

Nitrogen (N) forms nitrides and/or carbonitrides and thus contributes to producing finer crystal grains. On the other hand, an excessively high N content decreases the hot ductility of the steel. In view of this, N content is to be 0.001 to 0.02%. A lower limit for N content is preferably 0.002%. An upper limit for N content is preferably 0.015%, and more preferably 0.01%.

P: up to 0.03%

Phosphorus (P) is an impurity. P decreases the quench-cracking resistance of steel. In view of this, P content is to be not higher than 0.03%. P content is preferably not higher than 0.025%, and more preferably not higher than 0.02%.

S: 0.005 to 0.20%

Sulfur (S) forms MnS and increases the machinability of steel. On the other hand, cracks are likely to occur during hot forging when S is added excessively. In view of this, S content is to be 0.005 to 0.20%. A lower limit for S content is preferably 0.010%, more preferably 0.030%, and yet more preferably 0.035%. An upper limit for S content is preferably 0.15%, and more preferably 0.10%.

Nb: 0.005 to 0.060%

Niobium (Nb) forms NbC, NbN and Nb(CN) and makes γ grains finer. This increases grain boundaries per unit area that provide ferrite nucleation sites, thus increasing ferrite fraction. Nb also contributes to producing a finer microstructure after induction hardening, i.e., microstructure of the induction-hardened portions. On the other hand, an excessively high Nb content does not contribute to producing yet finer grains because, during heating during hot forging, Nb that cannot dissolve in the matrix forms coarse undissolved NbC. Furthermore, adding an excessive amount of Nb may cause cracking during casting. In view of this, Nb content is to be 0.005 to 0.060%. A lower limit for Nb content is preferably 0.008%, and more preferably 0.010%. An upper limit for Nb content is preferably 0.050%, and more preferably 0.030%.

The balance of the chemical composition of the crankshaft according to the present embodiment is Fe and impurities. Impurity as used here means an element originating from ore or scrap used as raw material for steel or an element that has entered from the environment or the like during the manufacturing process.

Some of the Fe included in the chemical composition of the crankshaft according to the present embodiment may be replaced by Ti. Ti is an optional element. That is, the chemical composition of the crankshaft according to the present embodiment may not contain Ti.

Ti: 0 to 0.060%

Titanium (Ti) forms TiC, TiN and Ti(CN) and makes γ grains finer. This increases grain boundaries per unit area that provide ferrite nucleation sites, thus increasing ferrite fraction. Its effect of making γ grains finer is particularly large if it is contained together with Nb. On the other hand, an excessively high Ti content results in a saturation in terms of its effects. In view of this, Ti content is to be 0 to 0.060%. A lower limit for Ti content is preferably 0.005%, and more preferably 0.020%. An upper limit for Ti content is preferably 0.050%, and more preferably 0.030%.

[Microstructure and Hardness]

In the crankshaft according to the present embodiment, for each of the pin and journal, the hardness measured at a position at a depth of ¼ of the diameter from the surface (hereinafter referred to as "¼-depth position") is higher than HV 245, the microstructure at that position is mainly composed of ferrite/pearlite, and the fraction of ferrite is not lower than 16%. The ¼-depth position is used for measurement herein since it is suitable for specifying a hardness and microstructure of a portion of the base material that has not been affected by induction hardening.

The hardness at the ¼-depth position is higher than HV 245. If the hardness at the ¼-depth position is not higher than HV 245, it is difficult to provide the required fatigue strength. A lower limit for the hardness at the ¼-depth position is preferably HV 250, and more preferably HV 255. On the other hand, an excessively high hardness at the ¼-depth position decreases machinability. An upper limit for the hardness at the ¼-depth position is preferably HV 350, more preferably HV 300, and yet more preferably HV 280.

Hardness at the ¼ depth position is obtained by taking a sample from each of the pin and journal where a surface perpendicular to their axis constitutes the surface to be observed, and then making a measurement in accordance with JIS Z 2244 (2009). The testing force is 300 gf (2.942 N).

The microstructure at the ¼-depth position is mainly composed of ferrite/pearlite. The area ratio of ferrite/pearlite at the ¼-depth position is preferably not lower than 90%, and more preferably not lower than 95%.

The microstructure at the ¼-depth position further has a fraction of ferrite not lower than 16%. A lower limit for the fraction of ferrite of the microstructure at the ¼-depth position is preferably 18%, more preferably 20%, and yet more preferably 22%. Although no specific upper limit for the fraction of ferrite is set, an excessively high ferrite fraction may not provide the required fatigue strength. An upper limit for the fraction of ferrite of the microstructure at the ¼-depth position is preferably 30%.

Fraction of ferrite of the microstructure at the ¼-depth position is measured in the following manner: A sample is taken from each of the pin and journal where a surface perpendicular to their axis constitutes the surface to be observed. The surface to be observed is polished, and then etched by a mixed solution of ethanol and nitric acid (i.e., nital). The area ratio of ferrite in the etched surface is measured by optical microscopy (with a magnification for observation of 100× to 200×) using image analysis. The measured area ratio of ferrite (%) is treated as fraction of ferrite.

The crankshaft according to the present embodiment preferably includes an induction-hardened layer having a microstructure mainly composed of martensite or tempered martensite at the surfaces of the pin and journal. The area ratio of martensite or tempered martensite in the induction-hardened layer is preferably not lower than 90%, and more preferably not lower than 95%. The thickness of the induction-hardened layer is preferably not lower than 2 mm, and more preferably not lower than 4 mm.

[Method of Manufacturing Crankshaft]

Although not limiting, the crankshaft according to the present embodiment may be manufactured by preparing a forged material for a crankshaft as discussed below and subjecting it to mechanical treatment such as cutting, grinding or hole drilling. After the mechanical treatment, induction hardening may be performed when necessary. Furthermore, after the induction hardening, tempering may be performed when necessary.

[Method of Manufacturing Forged Material for Crankshaft]

A method of manufacturing the forged material for a crankshaft suitable for a crankshaft according to the present embodiment will be described below.

FIG. 1 is a flow chart illustrating a method of manufacturing the forged material for a crankshaft according to the present embodiment. This manufacturing method includes the steps of preparing a steel material (step S1), hot forging the steel material (step S2), and cooling the hot-forged steel material (step S3).

First, a steel material with a chemical composition as described above is prepared (step S1). For example, a steel having a chemical composition as described above is smelted and then subjected to continuous casting or blooming to produce a steel piece. In addition to continuous casting or blooming, hot working, cold working, thermal treatment, and/or other processes may be performed on the steel piece.

Next, the steel material is hot forged into a rough crankshaft shape (step S2).

To specify heating conditions for the hot forging, although not limiting, the heating temperature is in the range of 1000 to 1300° C., for example, and the holding time is in the range of 1 second to 20 minutes, for example. The heating temperature is preferably 1220 to 1280° C., and more preferably 1240 to 1260° C.

According to the present embodiment, the temperature directly before finish forging (or, more specifically, surface temperature of the steel material directly before finish forging) is higher than 800° C. and lower than 1100° C. While the temperature directly before finish forging may be even higher under certain conditions, as will be described further below, an implementation with a temperature directly before finish forging higher than 800° C. and lower than 1100° C. will first be described.

Hot forging may be performed in multiple steps. In such implementations, the temperature directly before the last step, i.e., finish forging, is suitably higher than 800° C. and lower than 1100° C.

If the temperature directly before finish forging (hereinafter simply referred to as "finish forging temperature") is 1100° C. or higher, the y grains coarsen, making it difficult to provide a microstructure with a high ferrite fraction after cooling. On the other hand, if the finish forging temperature is 800° C. or lower, deformation resistance significantly increases, which significantly decreases the life of the die and makes industrial production difficult, if not impossible. Further, the pearlite transformation temperature rises and the lamellar spacing increases such that the required hardness may not be obtained. A lower limit for finish forging temperature is preferably 850° C., and more preferably 900° C. An upper limit for finish forging temperature is preferably 1075° C., and more preferably 1025° C.

The hot-forged steel material is cooled (step S3). During this, the average cooling rate in the temperature range from 800 to 650° C. is not higher than 2.5° C./s. If the average cooling rate in the temperature range from 800 to 650° C. is higher than 2.5° C./s, bainite is produced such that a microstructure mainly composed of ferrite/pearlite may not be obtained. If the average cooling rate in the temperature range from 800 to 650° C. is not higher than 2.5° C./s, a microstructure can be obtained that is mainly composed of ferrite/pearlite and has a ferrite fraction not lower than 16%.

It is preferable that, after hot forging and before cooling, the steel material is not reheated. If the steel material after hot forging is reheated, the y grains that have been made finer by hot forging coarsen. This decreases crystal grain boundaries per unit area that provide ferrite nucleation sites, such that a microstructure with a ferrite fraction not lower than 16% may not be obtained.

The lower the average cooling rate in the temperature range from 800 to 650° C., the larger the amount of ferrite precipitates and the higher the fraction of ferrite after cooling. The average cooling rate may be reduced by gradual cooling in the temperature range from 800 to 650°, or by a retention process in which the steel material is held at any desired temperature in the range of 800 to 650° C. for a predetermined period of time. The average cooling rate in the temperature range from 800 to 650° C. is preferably not higher than 1.0° C./s, more preferably not higher than 0.5° C./s, and yet more preferably not higher than 0.07° C./s. For the temperature range below 650° C., any desired cooling rate may be used.

If the steel material contains 0.005 to 0.060% Ti and the average cooling rate in the temperature range from 800 to 650° C. is not higher than 0.07° C./s, then, the fraction of ferrite of the microstructure after cooling remains 16% or higher even if the finish forging temperature is even higher. Specifically the fraction of ferrite of the microstructure after cooling remains 16% or higher if the temperature directly before finish forging is not lower than 1100° C. and not higher than 1180° C. In implementations where the steel material contains 0.005 to 0.060% Ti and the average cooling rate in the temperature range from 800 to 650° C. is not higher than 0.07° C./s, an upper limit for the temperature directly before finish forging is preferably 1150° C., and more preferably 1120° C.

The process described above results in a forged material for a crankshaft. The forged material for a crankshaft produced by the present embodiment has a hardness higher than HV 245, a microstructure mainly composed of ferrite/pearlite, and a ferrite fraction not lower than 16%.

A crankshaft and a method of manufacturing a forged material for a crankshaft according to an embodiment of the present invention have been described. The present embodiment provides a crankshaft with improved fatigue strength and machinability.

EXAMPLES

The present invention will now be described more specifically by means of examples. The present invention is not limited to these examples.

Steels having the chemical compositions shown in Table 1 were smelted by a 150 kg vacuum induction melting (VIM) furnace to produce an ingots. Each of these ingots was hot forged into a round bar with an outer diameter of 35 mm. This round bar was subjected to a normalizing process in which it was held at 950° C. for 30 minutes and then air cooled, to produce a test material. "-" in Table 1 indicates that the content of the relevant element was at an impurity level.

TABLE 1

| Steel no. | Chemical composition (in mass %, balance Fe and impurities) | | | | | | | | | | Category |
|---|---|---|---|---|---|---|---|---|---|---|---|
| | C | Si | Mn | P | S | Cr | Al | Nb | Ti | N | |
| 1 | 0.50 | 0.51 | 1.34 | 0.015 | 0.057 | 0.16 | 0.290 | 0.020 | — | 0.0039 | Inv. ex. |
| 2 | 0.49 | 0.52 | 1.35 | 0.016 | 0.061 | 0.16 | 0.300 | 0.020 | 0.024 | 0.0070 | Inv. ex. |
| 3 | 0.50 | 0.52 | 1.34 | 0.015 | 0.062 | 0.16 | 0.002 | — | — | 0.0040 | Comp. ex. |
| 4 | 0.50 | 0.51 | 1.35 | 0.015 | 0.060 | 0.16 | 0.290 | — | — | 0.0038 | Comp. ex. |
| 5 | 0.49 | 0.52 | 1.34 | 0.016 | 0.060 | 0.16 | 0.002 | 0.020 | — | 0.0040 | Comp. ex. |
| 6 | 0.49 | 0.52 | 1.36 | 0.015 | 0.063 | 0.16 | 0.003 | 0.020 | 0.023 | 0.0072 | Comp. ex. |
| 7 | 0.51 | 0.48 | 1.49 | 0.010 | 0.061 | 0.15 | 0.005 | — | — | 0.0040 | Comp. ex |
| 8 | 0.51 | 0.47 | 1.48 | 0.011 | 0.060 | 0.15 | 0.007 | 0.020 | — | 0.0043 | Comp. ex. |
| 9 | 0.38 | 0.49 | 1.49 | 0.014 | 0.059 | 0.16 | 0.003 | — | — | 0.0030 | Comp. ex. |
| 10 | 0.38 | 0.49 | 1.48 | 0.013 | 0.059 | 0.16 | 0.004 | 0.019 | — | 0.0036 | Comp. ex. |

A test specimen with an outer diameter of 8 mm and a height of 12 mm was taken from this material, and a hot-forging mock experiment was conducted by a hot deformation simulator (Thermecmaster). FIGS. 2 to 6 show heat patterns for the hot-forging simulation test.

Figure 2:
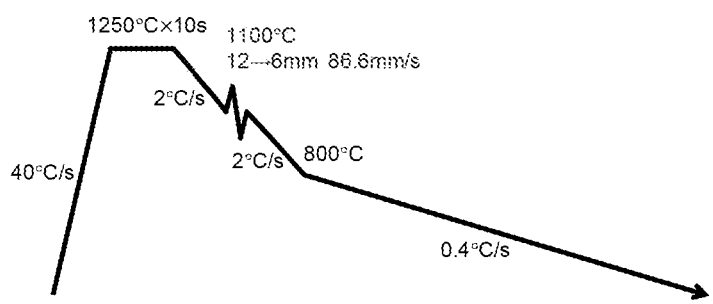
FIG. 2 is one heat pattern for hot-forging simulation test.

The heat pattern in FIG. 2 indicates typical forging conditions. In this heat pattern, the test specimen was held at 1250° C. for 10 minutes, and then subjected to a hot compression process that indicates forging at 1100° C. to a height of 6 mm, and air cooled to room temperature.

Figure 3:
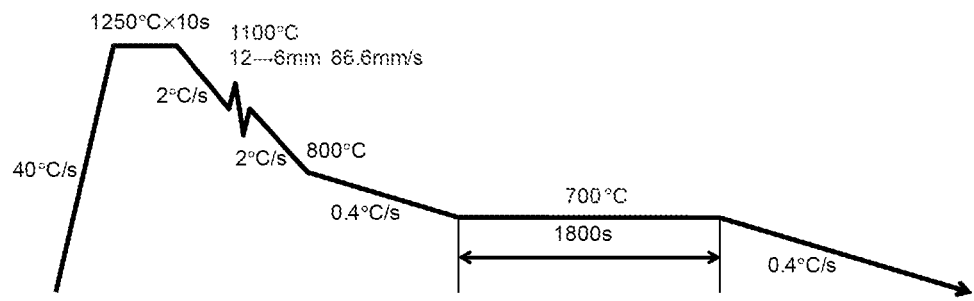
FIG. 3 is one heat pattern for hot-forging simulation test.

In the heat pattern in FIG. 3, a retention process at 700° C. is added after the hot forging as in FIG. 2. In this heat pattern, after the hot forging as in FIG. 2, a retention process was performed in which the specimen was held at 700° C. for 30 minutes and then air cooled to room temperature.

Figure 4:
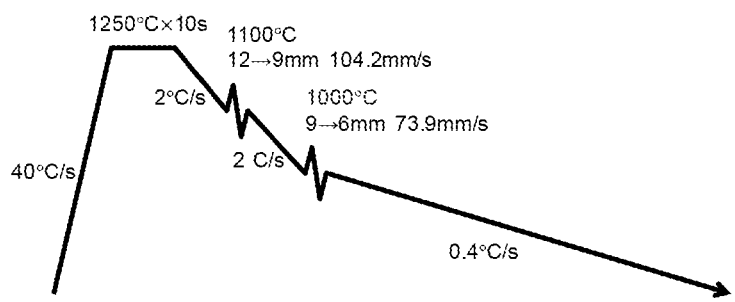
FIG. 4 is one heat pattern for hot-forging simulation test.

The heat pattern in FIG. 4 represents an implementation with a lower finish forging temperature. In this heat pattern, the test specimen was held at 1250° C. for 10 seconds and then subjected to a first step of hot compression that indicates rough forging at 1100° C. to a height of 9 mm, and further subjected to a second step of hot compression that indicates finish forging at 1000° C. to a height of 6 mm.

Figure 5:
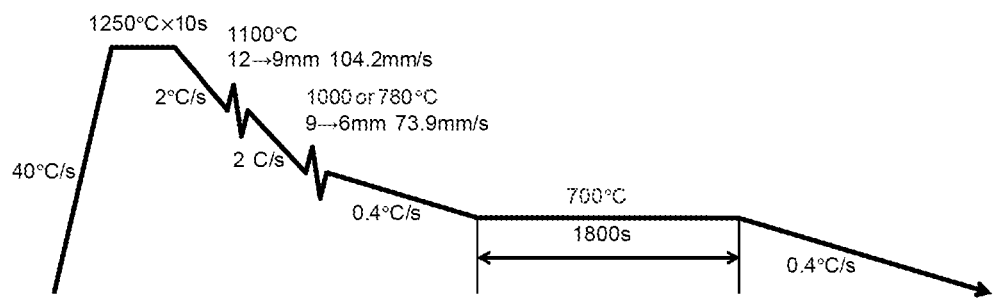
FIG. 5 is one heat pattern for hot-forging simulation test.

The heat pattern in FIG. 5 represents an implementation with a lower finish forging temperature and an additional retention process at 700° C. In this heat pattern, the test specimen was held at 1250° C. for 10 seconds, and then subjected to a first step of hot compression that indicates rough forging at 1100° C. to a height of 9 mm, and further subjected to a second step of hot compression that indicates finish forging at 1000° C. or 780° C. to a height of 6 mm. Thereafter, the specimen was subjected to a retention process in which it was held at 700° C. for 30 minutes, before being air cooled to room temperature.

Figure 6:
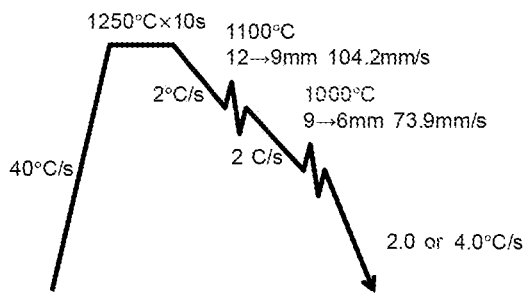
FIG. 6 is one heat pattern for hot-forging simulation test.

The heat pattern in FIG. 6 represents an implementation with a higher cooling rate after the hot forging as in FIG. 4.

Figure 7:
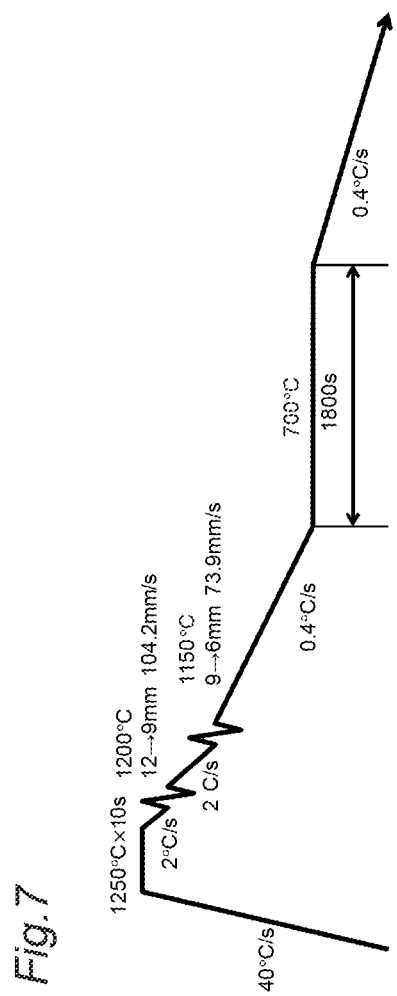
FIG. 7 is one heat pattern for hot-forging simulation test.

In the heat pattern in FIG. 7, the test specimen was held at 1250° C. for 10 seconds and then subjected to a first step of hot compression that indicates rough forging at 1200° C. to a height of 9 mm, and further subjected to a second step of hot compression that indicates finish forging at 1150° C. to a height of 6 mm. Thereafter, the specimen was subjected to a retention process in which it was held at 700° C. for 30 minutes, before being air cooled to room temperature.

The conditions for the forging simulation test are shown in Table 2.

TABLE 2

| Manufacture designation | Temp. directly before finish forging (° C.) | Avg. cooling rate from 800 to 650° C. (° C./s) | Heat pattern |
|---|---|---|---|
| A | 1000 | 0.4 | FIG. 4 |
| B | 1000 | 0.069 | FIG. 5 |
| C | 1100 | 0.4 | FIG. 2 |
| D | 1100 | 0.069 | FIG. 3 |
| E | 780 | 0.069 | FIG. 5 |
| F | 1000 | 4.0 | FIG. 6 |
| G | 1000 | 2.0 | FIG. 6 |
| H | 1150 | 0.069 | FIG. 7 |

A sample was taken from each cooled test specimen, and the fraction of ferrite and Vickers hardness of the test specimen were measured at or near the center thereof. The test results are shown in Table 3.

TABLE 3

| Test desig. | Steel No. | Manufacture designation | Structure | Fα (%) | Hardness (HV) | Estimated drill life (number of holes) | Category |
|---|---|---|---|---|---|---|---|
| 1A | 1 | A | F/P | 24 | 265 | 56 | Inv. ex. |
| 1B | 1 | B | F/P | 20 | 268 | 44 | Inv. ex. |
| 2A | 2 | A | F/P | 24 | 252 | 63 | Inv. ex. |
| 2B | 2 | B | F/P | 26 | 255 | 67 | Inv. ex. |
| 2D | 2 | D | F/P | 22 | 259 | 54 | Inv. ex. |
| 3B | 3 | B | F/P | 10 | 256 | 24 | Comp. ex. |
| 4B | 4 | B | F/P | 12 | 259 | 28 | Comp. ex. |
| 5B | 5 | B | F/P | 14 | 274 | 26 | Comp. ex. |
| 6A | 6 | A | F/P | 15 | 263 | 34 | Comp. ex. |
| 7B | 7 | B | F/P | 6 | 294 | <10 | Comp. ex. |
| 8A | 8 | A | F/P | 13 | 298 | 11 | Comp. ex. |
| 9B | 9 | B | F/P | 29 | 233 | 85 | Comp. ex. |
| 10A | 10 | A | F/P | 44 | 241 | 121 | Comp. ex. |
| 10B | 10 | B | F/P | 37 | 245 | 100 | Comp. ex. |
| 1C | 1 | C | F/P | 11 | 302 | <10 | Comp. ex. |
| 1D | 1 | D | F/P | 14 | 288 | 19 | Comp. ex. |
| 2C | 2 | C | F/P | 14 | 277 | 24 | Comp. ex. |
| 3C | 3 | C | F/P | 7 | 267 | 11 | Comp. ex. |

TABLE 3-continued

| Test desig. | Steel No. | Manufacture designation | Structure | Fα (%) | Hardness (HV) | Estimated drill life (number of holes) | Category |
|---|---|---|---|---|---|---|---|
| 7C | 7 | C | F/P | 6 | 295 | <10 | Comp. ex. |
| 9C | 9 | C | F/P | 16 | 235 | 50 | Comp. ex. |
| 1E | 1 | E | F/P | 27 | 240 | 76 | Comp. ex. |
| 1F | 1 | F | F/P/B | 3 | 330 | <10 | Comp. ex. |
| 1G | 1 | G | F/P | 20 | 278 | 40 | Inv. ex. |
| 2H | 2 | H | F/P | 19 | 260 | 45 | Inv. ex. |

"F/P" in the column labeled "Structure" in Table 3 indicates that the microstructure of the relevant test specimen was mainly composed of ferrite/pearlite. "F/P/B" in the same column indicates that the microstructure of the relevant test specimen was a mixed microstructure of ferrite/pearlite and bainite. A value in the column labeled "Fα" in Table 3 indicates the fraction of ferrite in the microstructure of the relevant test specimen.

A value of "Estimated drill life" in Table 3 is an estimated number of holes created by an SKH51 drill with an outer diameter of 5 mm until the drill became incapable of making a hole under the following conditions: the cutting speed was 50 m/min, the feed was 0.2 mm/rev, no cutting oil was used, and the hole depth was 15 mm. These values of estimated drill life are estimates from other experiment results.

The test specimens labeled with test designations 1A, 1B, 2A, 2B, 2D, 1G and 2H had hardnesses higher than HV 245 and ferrite fractions not lower than 16%. Particularly the test specimens labeled with designations 2D and 2H had microstructures with ferrite fractions not lower than 16% even though the temperatures directly before finish forging were relatively high, i.e., 1100° C. and 1150° C., respectively.

The test specimens labeled with designations 3B, 4B, 5B, 6A, 7B and 8A had ferrite fractions lower than 16%. This is presumably because at least one of the Al content and Nb content of each of the steels labeled with steel nos. 3 to 8 was too low.

The test specimens labeled with designations 9B, 10A, 10B, and 9C had hardnesses not higher than HV 245. This is presumably because the C contents of the steels labeled with steel nos. 9 and 10 were too low.

The test specimens labeled with designations 1C, 1D and 2C had ferrite fractions lower than 16%. This is presumably because the temperatures directly before finish forging was too high.

The test specimens labeled with designations 3C and 7C had ferrite fractions lower than 16%. This is presumably because the Al and Nb contents of the steels labeled with steel nos. 3 and 7 were too low and the temperatures directly before finish forging were too high.

The test specimen labeled with designation 1E had a hardness not higher than HV 245. This is presumably because the temperature directly before finish forging was too low.

The test specimen labeled with designation 1F had a ferrite fraction lower than 16%, and also contained bainite in the microstructure. This is presumably because the average cooling rate in the temperature range from 850 to 600° C. was too high.

Although embodiments of the present invention have been described, the above-described embodiments are exemplary only intended to allow the present invention to be carried out. Accordingly the present invention is not limited to the above-described embodiments, and the above-described embodiments, when carried out, may be modified as appropriate without departing from the spirit of the invention.

The invention claimed is:

1. A crankshaft including a pin and a journal, having a chemical composition consisting of, in mass %:
   0.48 to 0.60% C;
   0.01 to 1.50% Si;
   0.4 to 2.0% Mn;
   0.01 to 0.50% Cr;
   0.20 to 0.50% Al;
   0.001 to 0.02% N;
   up to 0.03% P;
   0.005 to 0.20% S;
   0.005 to 0.060% Nb;
   0 to 0.060% Ti; and
   balance Fe and impurities,
   wherein, for each of the pin and journal, a hardness measured at a position at a depth of ¼ of a diameter from a surface is not lower than HV 250, a microstructure at that position is mainly composed of ferrite and pearlite, and a fraction of ferrite is not lower than 16%,
   wherein the hardness is measured in accordance with JIS Z 2244 (2009) and the testing force is to be 300 gf (2.942 N).

2. The crankshaft according to claim 1, wherein the Ti content is 0.005 to 0.060 mass %.

3. The crankshaft according to claim 1, wherein the fraction of ferrite is not higher than 26%.

4. The crankshaft according to claim 1, wherein the hardness is not higher than HV 278.

* * * * *